US011900832B2

(12) United States Patent
Nusbaum et al.

(10) Patent No.: US 11,900,832 B2
(45) Date of Patent: Feb. 13, 2024

(54) TACTILE RESPONSIVE SURFACE FOR VIRTUAL REALITY TRAINING DEVICE

(71) Applicant: Gulfstream Aerospace Corporation, Savannah, GA (US)

(72) Inventors: Chris Nusbaum, Savannah, GA (US); Brian Toler, Savannah, GA (US); Casey Tolbert, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 1217 days.

(21) Appl. No.: 16/414,543

(22) Filed: May 16, 2019

(65) Prior Publication Data
US 2019/0355272 A1 Nov. 21, 2019

Related U.S. Application Data

(60) Provisional application No. 62/673,035, filed on May 17, 2018.

(51) Int. Cl.
| | | |
|---|---|---|
| *G09B 9/42* | (2006.01) | |
| *G06F 3/01* | (2006.01) | |
| *G06T 19/00* | (2011.01) | |
| *G09B 9/16* | (2006.01) | |
| *G09B 9/30* | (2006.01) | |

(52) U.S. Cl.
CPC ............. *G09B 9/42* (2013.01); *G06F 3/011* (2013.01); *G06F 3/012* (2013.01); *G06T 19/006* (2013.01); *G09B 9/165* (2013.01); *G09B 9/307* (2013.01)

(58) Field of Classification Search
CPC .. G09B 9/16; G09B 9/165; G09B 9/42; G09B 9/307; G06F 3/011; G06F 3/012; G06T 19/00; G06T 19/006
See application file for complete search history.

(56) References Cited

U.S. PATENT DOCUMENTS

| | | | |
|---|---|---|---|
| 5,803,738 A | 9/1998 | Latham | |
| 10,529,248 B2* | 1/2020 | Chavez | .................. G09B 9/302 |
| 2004/0259059 A1* | 12/2004 | Aoki | ........................ A63F 13/45 |
| | | | 463/6 |
| 2007/0122778 A1* | 5/2007 | Beitel | ....................... G09B 9/00 |
| | | | 434/219 |
| 2009/0195652 A1* | 8/2009 | Gal | ..................... H04N 5/23216 |
| | | | 348/148 |

(Continued)

OTHER PUBLICATIONS

Fabio Bruno et al, Mixed Prototyping for Products Usability Evaluation, Information, ASME 2010 International Design Engineering Technical Conferences and Computers and Information in Engineering Conference, vol. 3, 30th Computers and Information in Engineering Conference, Parts A And B, Montreal, Quebec, Canada, Aug. 18, 2010, pp. 2-6, figures 3, 4, 7.

*Primary Examiner* — Timothy A Musselman
(74) *Attorney, Agent, or Firm* — LKGLOBAL | Lorenz & Kopf, LLP

(57) ABSTRACT

An input device for providing user input to a computing device includes a seat portion allowing a user to sit on the device. The input device further includes several human interface devices having positional sensors that detect changes in rotation or translation of a movable tactile surface with respect to a fixed tactile surface and provide a signal indicative thereof. These signals are used are used by a computer to change an image of virtual fixed and movable surfaces within a head mounted display.

19 Claims, 7 Drawing Sheets

(56) References Cited

U.S. PATENT DOCUMENTS

2015/0056583 A1* 2/2015 Felege .................... G09B 9/05
                                                       434/219
2016/0019808 A1   1/2016 Chavez et al.

* cited by examiner

TACTILE RESPONSIVE SURFACE FOR VIRTUAL REALITY TRAINING DEVICE

CROSS-REFERENCE TO RELATED APPLICATION

This application claims the benefit of U.S. Provisional Application No. 62/673,035, filed May 17, 2018, which is incorporated herein by reference in its entirety.

FIELD OF THE INVENTION

The present invention relates to training devices and methods for providing tactile responsive surface for a computing device. More particularly, the present invention relates to a modular tactile responsive surface that provides an input surface for a computing device having a virtual reality headset.

BACKGROUND OF THE INVENTION

For humans to interact and operate computers, external input devices are generally required. Signals from these external input devices are received by the computer and processed to act as a control signal for controlling an aspect of the computer's function and/or applications (programs) running on the computer.

Traditionally, input devices such as keyboards, mice, game controllers and the like have focused on receiving input movements from the hands and particularly the fingers of users. Of note is the rise of virtual reality ("VR") technology that enables users to be fully immersed in computer generated environments. VR technology platforms are poorly suited for traditional input methods as they can break immersion and detract from the user's experience. Further, they are poorly suited for more immersive, intuitive control schemes as occupants in a VR space fail to tactility interact with surfaces within a VR space. The development of immersive computer-generated environments such as those used for training and flight simulation have highlighted the need for new input devices.

With respect to training scenarios, there are situations where students are attempting to learn only a portion of a complex control panel. The presentation of the complex control panel can however be confusing for those attempting to learn a small subset of the controls.

SUMMARY OF THE INVENTION

As specified in the Background of the Invention section above, there is a need for improved devices and methods for providing user input for controlling and/or interacting with a computing device in computerized training scenarios.

To overcome the afore mentioned problems, the system according to the present teachings provides a virtual aircraft cockpit which is viewed with head mounted displays. These head mounted displays have sensors that measure the viewing angle of the user's head and feeds it back to the system so that the user's view is defined by viewing head angle. A set of fixed and movable tactile surfaces are provided within the reach of a seated user. The images in the head mounted display are constrained so that surfaces displayed in the head mounted displays correspond to an appropriate view of the interior of the plane cockpit which are aligned with the fixed and movable tactile surfaces.

These fixed and movable tactile surfaces correspond to controller surfaces within the plane cockpit, allowing the user in VR to interact with controls and receive tactile feedback. Head angle information from the head mounted display is presented as a part of the human interface device output which is fed to a computer to affect the image presented to the user through the head mounted display.

According to these teachings, the system can include a tactile responsive surface which aligns and is co-planar with surface within the virtual environment. The tactile responsive surface can have a series of generally planar fixed surfaces and a series of rotatable and/or translatable surfaces. These rotatable and/or translatable surfaces incorporate most of the control panel or cockpit dash surfaces which would be reachable by a hand of a seated user. Also viewable is a view through the cockpit windshield. The static and movable components can have associated sensors which feed signals back through a controller to affect the video signal of the head mounted displays or VR headset. These sensors can be digital, analog, or capacitive.

In at least one embodiment the tactile responsive surface related to a control panel is constructed from selectively interconnected component modules with the advantage of ease of assembly. These interconnected component modules can include: a base platform which allows adjusting the height and position of the fixed tactile responsive surface and a plurality of movable members which can be selectively moved with respect to the fixed responsive tactile surface movable tactility responsive surface. The movable members can have variable stops for allowing the user to engage with a movable tactility responsive surface such as a throttle. Electronic interactive sensors associated with the movable members allow for interaction with an aircraft simulator. As training requires, the user can interact with only a portion of the complex control panel, including movable members as needed in a training regime. An alarm is provided should the user attempt to engage with restricted portions of the control panel.

According to the previous teachings, the control panel relates to an aircraft's controls associated with a plane. The user can be restricted to only portions of the control panel related to ground transportation of the aircraft. Alarms will be sounded if a user attempts to engage with portions of the control panel not associated ground transportation of an aircraft.

According to the present teachings, a virtual reality system for a VR system user is provided having a floor engaging member. The floor engaging member has a floor engaging surface and a longitudinal axis generally parallel to the floor engaging surface. A seat support is coupled to and selectively movably with respect to the floor engaging surface. A fixed tactile surface and a movable tactile surface, corresponding to the control panel, is positioned within arm's reach of a seated VR user. A first plurality of sensors are provided which are configured to detect the movement of the movable tactile surface with respect to the fixed tactile surface. The first plurality of sensors provide a first signal indicative of the movement of the movable tactile surface with respect to the fixed tactical surface. A motion tracking head mounted display, which is configured to receive a video signal input, has a second plurality of sensors that are configured to detect the movement of the head mounted display with respect the ground. The second plurality of sensors are configured to provide a second signal indicative of the movement of the head mounted display with respect the ground.

According the above teachings, a computer is configured to receive the first and second signals and selectively convert user motion into control signals for motion and functional control of software incorporated in the computer. The computer is configured to provide signals to the motion tracking head mounted display in response to the control signals. In this regard, the computer is configured to send video to the video signal input in response to the first and second signals. The motion tracking head mounted display is configured to create a first image component at the location of the fixed tactile surface and to create a second image component at the location of the movable tactile surface. The computer changes the first and second image component in response to changes in the first and second control signals.

According the present teachings, the virtual reality system can be used as a ground crew training device, where the users can be restricted to use of only portions of the control panel related to ground transportation of the aircraft. Alarms can be provided which can be sounded if a user attempts to engage with portions of the control panel not associated ground transportation of an aircraft.

According to the present teachings, the tactile members, both fixed and movable, can be 3d printed based on CAD models of a vehicle cockpit. Movable tactile members are rotatably or translatably fixed in place with respect to the fixed tactile surface. The moveable tactile members have associated sensors which produce a signal indicative of the movement of the moveable members that are used by a computer to change a video signal of the head mounted display.

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

DETAILED DESCRIPTION OF THE INVENTION

Figure 1:
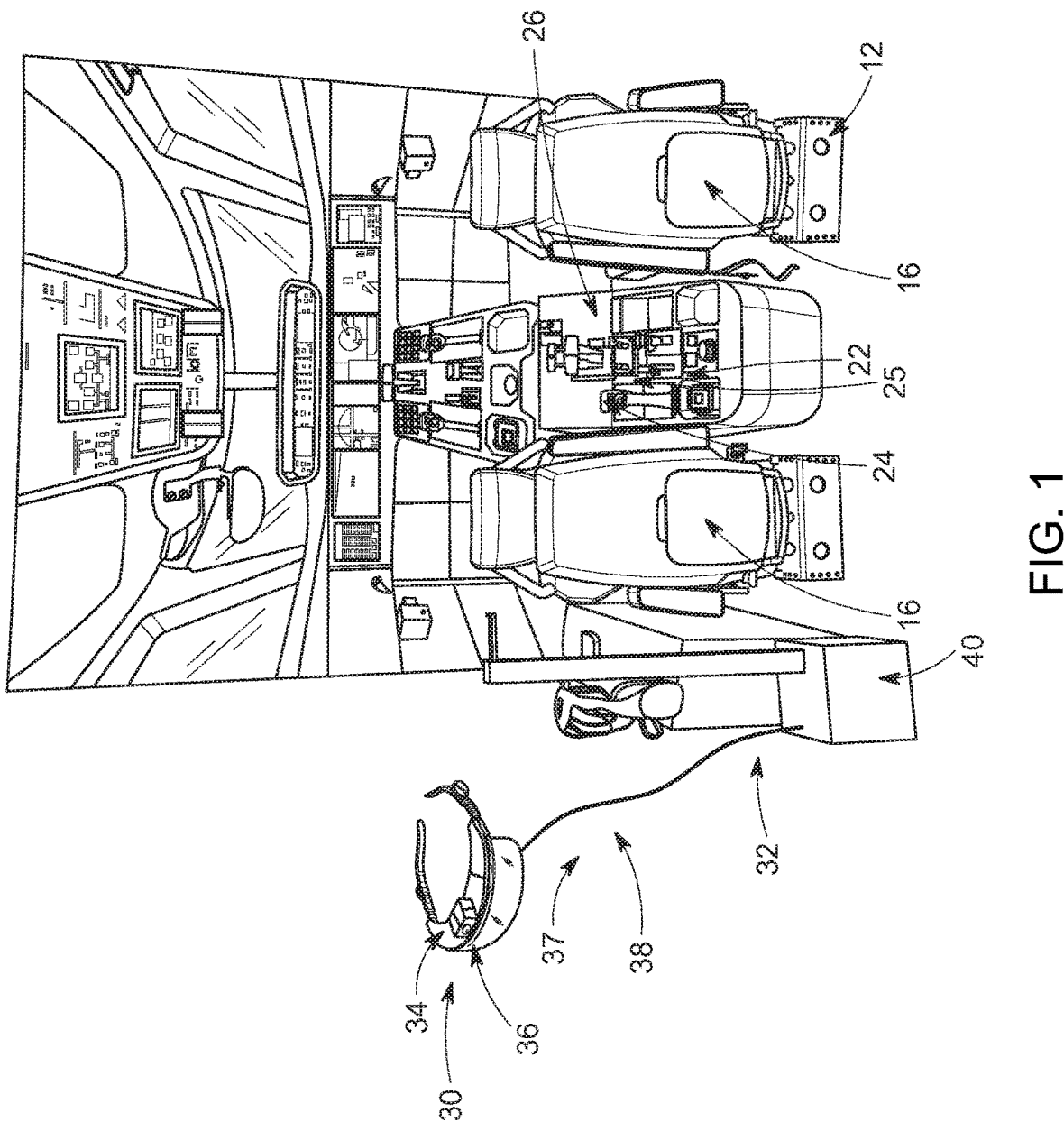
FIGS. 1-3 show perspective views of a VR interface in accordance with an embodiment of the disclosure.

In the following, reference is made to embodiments of the disclosure. However, the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether an advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be an element or limitation of the appended claims except where explicitly recited in a claim(s).

As best seen in FIGS. 1-6C, an input device 10 is provided having a floor engaging member 12 with a floor engaging surface 14 and a longitudinal axis generally parallel to the floor engaging surface 14. The floor engaging member 12 is configured to selectively support a seat 16 which is positioned generally parallel to the floor engaging surface 14. A bearing 18 is provided that is disposed between the floor engaging member 12 and the seat 16 which is configured to allow relative translation of the seat 16 along the longitudinal axis with respect to the floor. A seat position sensor 20 is configured to detect the movement of the seat 16 with respect to the floor engaging member 12. An output of the seat position sensor 20 is used to configure the location of a virtual reality tactile surface (described below) with respect to fixed 22 and moveable 24 responsive tactical surfaces.

Positioned within arm's reach of the seated VR user are the fixed 22 and movable 24 tactile surfaces. A first plurality of sensors 26 are positioned relative to the fixed tactile surface 22 and the movable tactile surface 24 which are configured to detect the relative movement of the movable tactile surfaces 24 with respect to the fixed tactile surface 22 and provide a first set of signals 25 thereof. By way of non-limiting examples, these sensors 26 can include an input device which can include at least one binary on/off switch that provides a digital output signal, least one analog sensor which provides an analog output signal, or analog sensor detects one of the change in resistance and a change in capacitance. The movable tactile surfaces 24 can have variable stops for allowing the user to engage with a movable tactility responsive surface to simulate proper tactile response for an aircraft controller.

Optionally, a plurality of movable tactile surfaces 24' 24" in the form of first and second movable tactile surfaces are disposed at first and second distances along an axis associated with the first and second moveable tactile surfaces 24' and 24", the second distance being less than the first distance. As described below, the fixed and movable tactile surfaces 22 and 24 have corresponding fixed and movable virtual tactile surfaces which are displayed to the user in a motion tracking head mounted display 30 (FIG. 1) at locations corresponding to the fixed and movable surfaces 22 and 24.

The motion tracking head mounted display 30 (FIG. 1) is configured to receive a video signal input 32 and has a second plurality of sensors 34 configured to detect the translational movement of the head mounted display 30 (FIG. 1) with respect the ground. The head mounted display 30 (FIG. 1) can have a third plurality of sensors 36 configured to measure the relative rotational movement of the display 30 (FIG. 1) and producing a third signal 37 indicative of rotation of the head mounted display 30 (FIG. 1). The second and third plurality of sensors 34 and 36 are configured to provide a second signal 38 indicative of the movement of the head mounted display with respect the ground. The motion tracking head mounted display 30 (FIG. 1) is configured to create a first image component of surfaces of an aircraft cockpit at the location of the fixed tactile surfaces 22. Additionally, the motion tracking head mounted display 30 (FIG. 1) is configured to create a second image component at the location of the movable tactile surface 24. Movement of the tactile surface will cause a change in a component of the image produced by the head mounted display 30 (FIG. 1).

A computer 40 is provided which is configured to receive the first 25 and second signals 28 and selectively convert user motion into control signals for motion and functional control of software incorporated in the computer 40. The computer 40 is configured to provide the video signal input 42 to the motion tracking head mounted display 30 (FIG. 1) in response to the control signals 25, 28 and 38.

Figure 2:
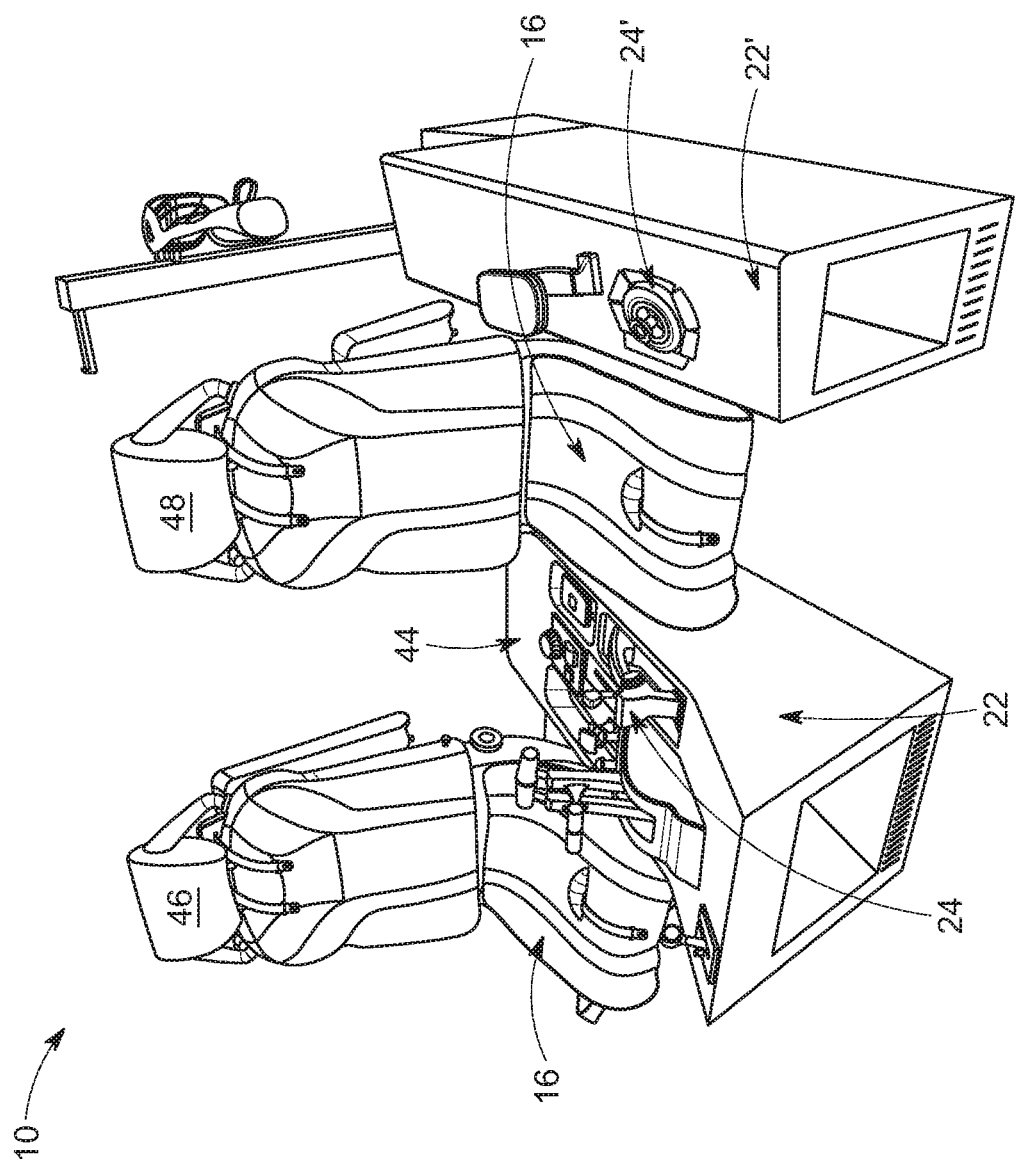
Figure 3:
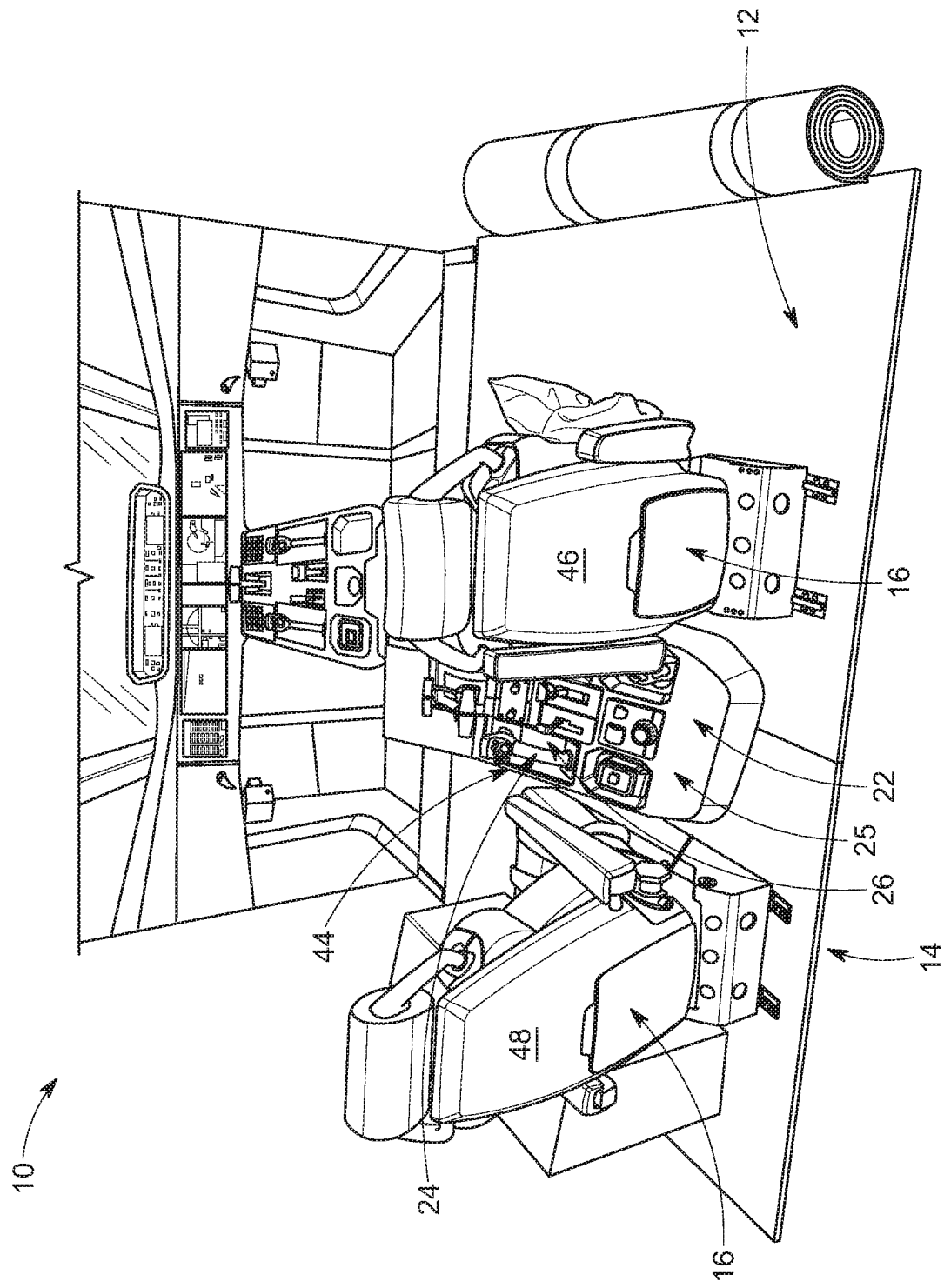
Figure 4:
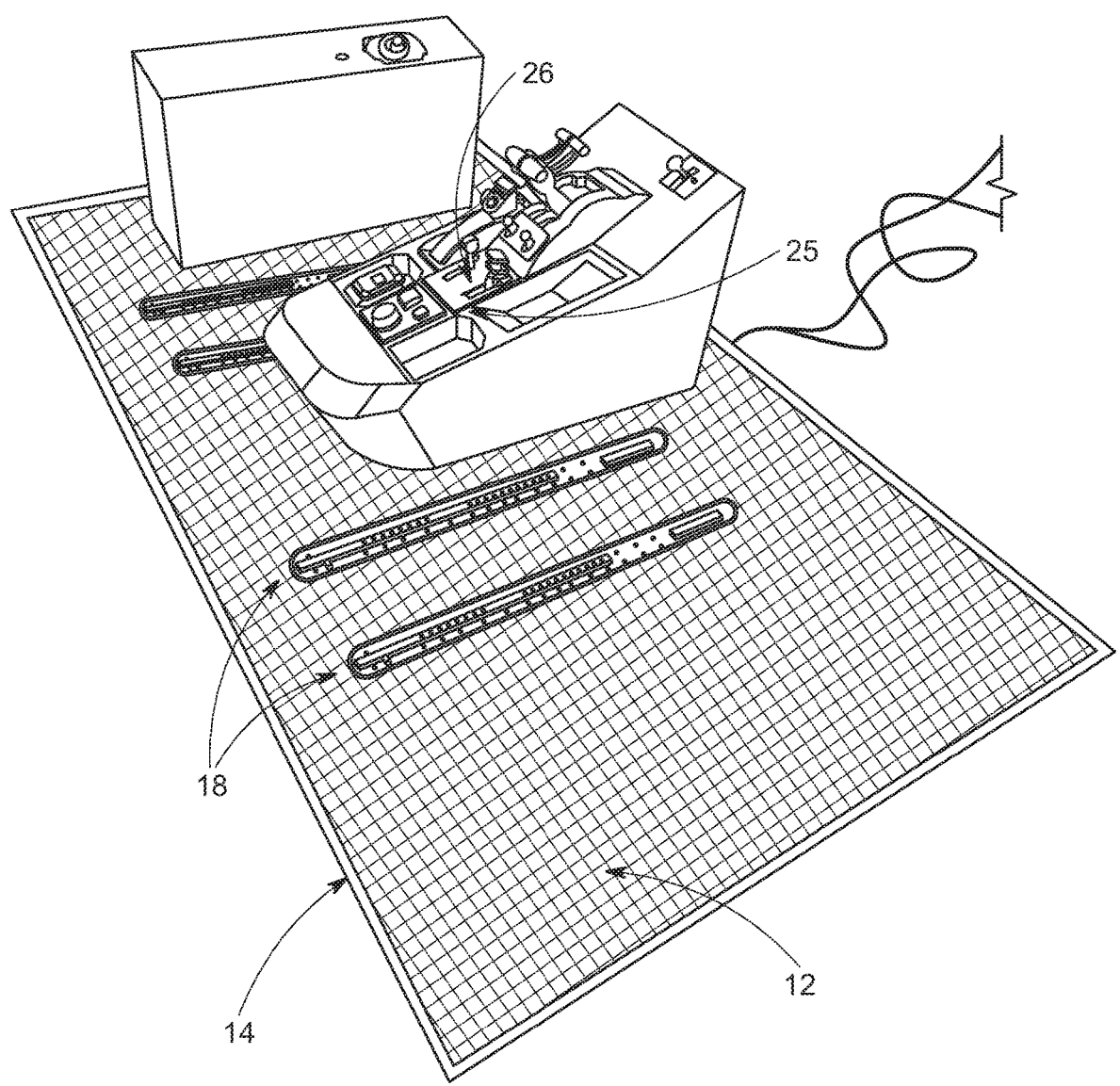
FIG. 4 represents a base with center and left consoles in accordance with an embodiment of the disclosure.
Figure 5:
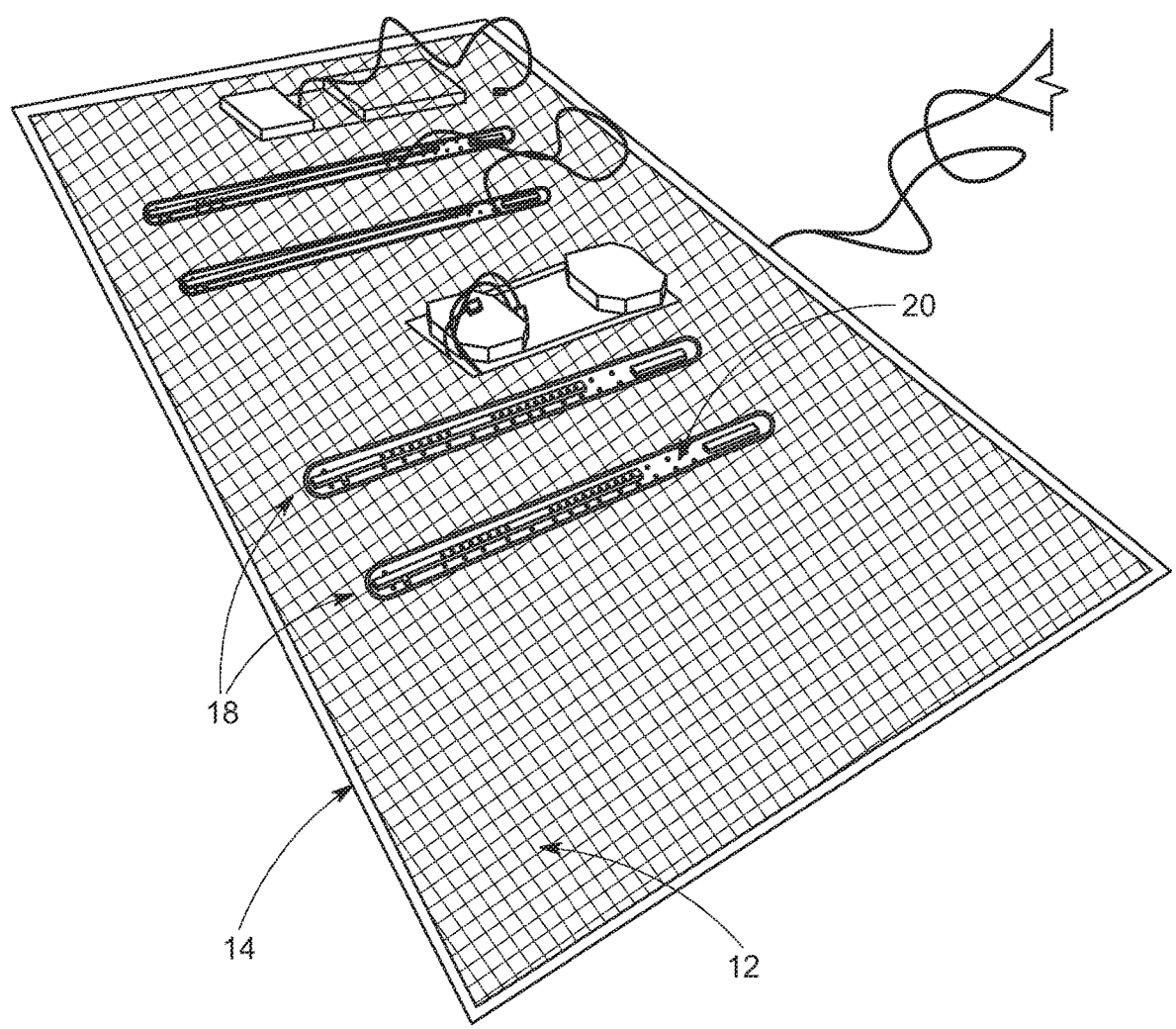
FIG. 5 shows a platform base in accordance with an embodiment of the disclosure.

As best seen in FIGS. 1-3, a virtual aircraft cockpit is projected using a second projector (not shown) onto a reflective screen as well as the fixed and movable tactile surface as well as viewed with motion tracking head mounted display 30 (FIG. 1). This will allow others observing the system from outside of the head mounted display 30 (FIG. 1) to contribute to training. The motion tracking head mounted display 30 (FIG. 1) measures the angle of the user's head and feeds it back to the computer 40 so that the user's viewing angle is monitored and used to affect the display signal. The head mounted display 30 (FIG. 1) is then constrained to that user but "uncoupled" so that the view from the head mounted display 30 (FIG. 1) represents the view of a cockpit as would be seen by a pilot or ground crew seated within a pilot or co-pilot seat.

The associated with the virtual aircraft cockpit, which is viewed with the head mounted display 30 (FIG. 1), is a first tactile feedback surface 20 in the form of a center console 44 being disposed between a pair of seats 46, 48. Additionally, shown is a left console 50 which has a joystick 52 that represents a moveable surface 24 which corresponds to an aircraft controller. The center and left consoles 44, 50 represent fixed tactile feedback surfaces 22 which give tactile feedback to a user should the user reach out and touch these surfaces while within a VR system. These surfaces give feedback to the VR user and enhances the user experience and increases realism. To enhance the realism, the surfaces of the center and left console are aligned with the location of displayed surfaces in VR space.

Also associated with the fixed tactile feedback surfaces 22 is the plurality of movable members 24' and 24" which are rotatable and or translatable with respect to the center console 44. These members 24' and 24" are aligned in VR space with movable VR surfaces in a manner which allows the user to encounter the movable members 24' and 24" when reaching out for a Virtual surface in a VR environment. As described in more detail below, the movable tactile surfaces 24' and 24" will move based on movement of the movable surface in the simulator using the first sensor outputs.

In at least one embodiment the tactile responsive surfaces related to a control panel is constructed from interconnected component modules with the advantage of ease of assembly. This can include a base platform 60 having an adjustment mechanism 62 which allows for the adjustment of the height and weight of the fixed and movable tactile responsive surfaces 22 and 24. The base platform can be incorporated into the floor engaging member 12.

As an example of the systems' use, the training system is intended to train ground crews who are needed to be trained only in a small portion of the control panel. As such, optionally, only the portion of the complex control panel, which is needed for training can visually highlighted, and engageable by user. Optionally, an alarm is provided should the user attempt to engage with restricted portions of the control panel. This alarm can be haptic, visual, or auditory. By using a VR based training system, the cost of training ground crews can be significantly reduced as expensive access to full flight trainers and travel to training centers can be reduced.

The fixed and movable tactily responsive members, can be 3d printed based on CAD models of a vehicle cockpit. Movable tactile members are fixed in place with respect to at least one axis of rotation to the fixed tactile surface. The moveable tactile members have associated sensors which produce a signal indicative of the movement of the moveable members and change a video signal of the VR display in response to the signal indicative of movement of the movable tactile surface. Force generating members can be associated with the movable tactile responsive members.

According to the teachings, the systems show one embodiment of an input device of the present disclosure that includes a tactily responsive surface and surfaces. In this embodiment the tactily responsive surfaces is composed of stacking 3d printed fixed and moveable tactily responsive surface.

Figure 6A:
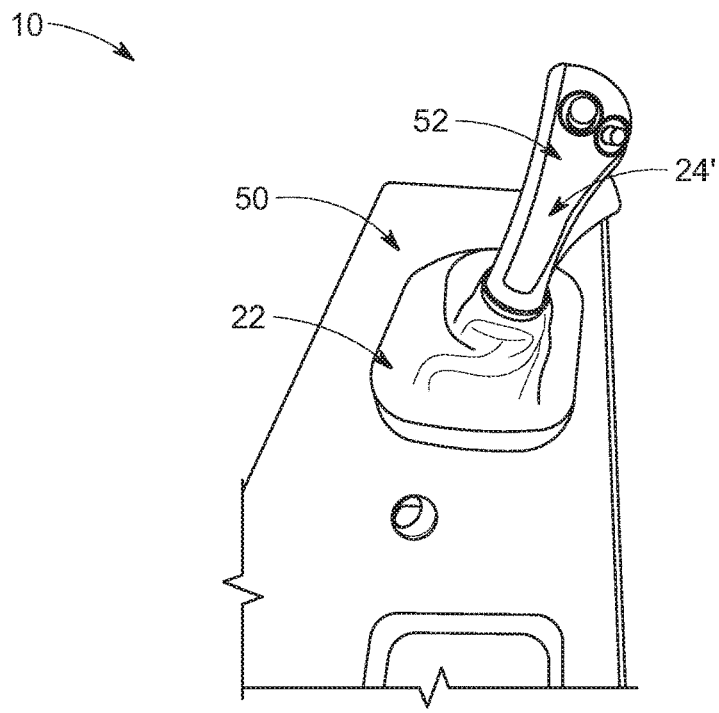
FIGS. 6A-6C represents exemplar fixed and movable tactile interface surfaces in accordance with the present disclosure.
Figure 6B:
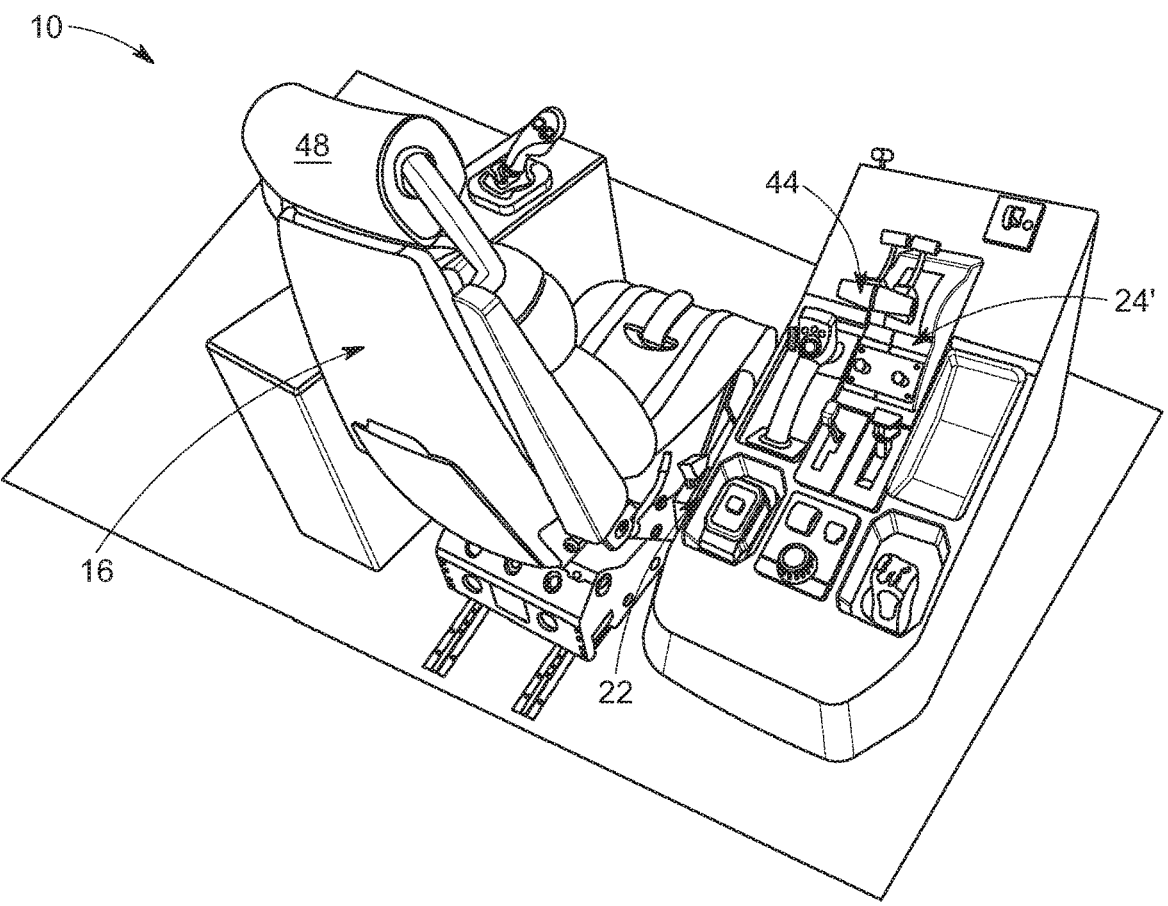
Figure 6C:
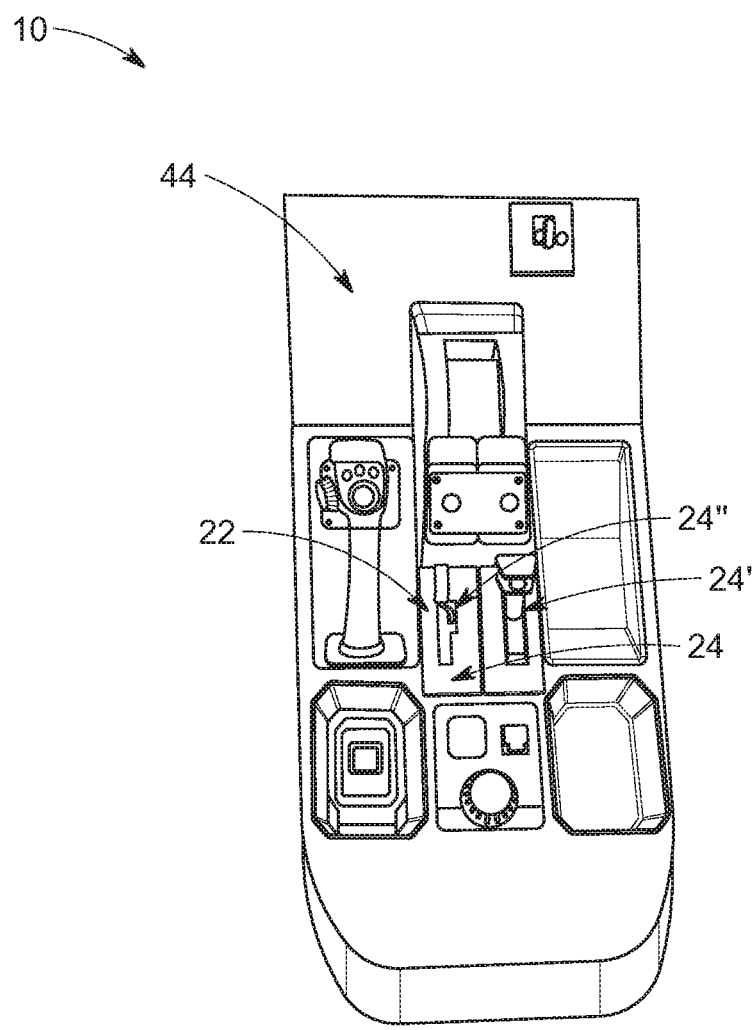

Referring now to FIGS. 6A-6C, the embodiments in FIG. 1 to FIG. 5, there is shown embodiments of the invention with the addition of a contoured tactily responsive surfaces 22 and 24 with the advantage of unobtrusive support for the movement of control members. The contoured tactily responsive movable surfaces 24' and 24" rotate or slide with respect to the fixed surfaces along an interface slot or channel. The contoured tactily responsive fixed surface 22 and surfaces has the advantage of providing a stable support and friction surface. Mounting for securing the surfaces and seats can be coupled to a base.

The sensors 26 for the movable tactile surfaces 24 can include a multi-axis accelerometer sets for each human input device as well as the head mounted display 30 (FIG. 1). These accelerometer sets can include a three-axis accelerometer system and a multi-axis gyroscope system, such as a three-axis gyroscope system. The outputs of these respective systems are fed to microprocessor or microcontroller that has been programmed as described more fully herein to perform the control function. The computer 40 can be formed using a microprocessor specifically configured to monitor the sensors 20, 22, 24 and adjust the video output associated with the head mounted display 30 (FIG. 1).

Microprocessor or controller can be connected to the sensors 26 of the moveable tactily responsive members to supply an engagement control signal via an Arduino or a serial port, whereupon it begins tracking motion using data from the three-axis accelerometer and from the three-axis gyroscope. Time zero, position zero and reference frame establishment is completed. Subsequent movements are assessed with respect to these initial starting time, position and reference frame, to determine if and/or when the device has achieved connection for feedback. Traversed distances in each of the three axes are incrementally measured starting from the (0,0,0) position where the three-axis accelerometer was located at the instant of an engagement control. The three-axis gyroscope orientation now of an engagement control defines the axes of the local sensing member.

The microprocessor uses the incremental distance traveled, taking all three position dimensions and all three rotation orientations into account, to compute a traveled distance. The traveled distance is generally defined as the distance from the origin (at an engagement control) to the current position of the device. Displacement values in periodic increments, the travel distance is calculated by summing the squares of the individual x, y and z components of these incremental displacements. In this regard, the true incremental distance would be calculated by taking the square root of the sum of the squares. However, to reduce the computational burden on the microprocessor, the square root step is dispensed with. It is possible to do so because the travelled distance squared can be readily compared with the safe distance squared to arrive at a safe feedback decision. Having calculated the current travelled distance, the microprocessor then updates distance to make these values available to the feedback algorithm.

The acceleration values obtained for the head mounted display 30 (FIG. 1), can be time integrated by multiplying by a time step interval to arrive at a velocity value. As previously discussed, accelerometers, such as those used in the three-axis accelerometer system produce an output in the presence of gravitational forces or forces caused by movement of the mobile platform with respect to ground. The effect of such forces is not ignored, as they may introduce errors into the solution, particularly considering that the body to which the sensors are mounted may be rotating about any or all of the yaw, pitch or roll axes. Thus, the microprocessor compensates by "subtracting out" the effect of gravity and movement of the mobile platform upon each of the acceleration axes, as dictated by the current reference frame orientation.

These computer programs (also known as programs, software, software applications, scripts, or program code) include machine instructions, for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The apparatus can include, in addition to hardware, code that creates an execution environment for the computer program in question, e.g., code that constitutes processor firmware, a protocol stack, a database management system, an operating system, or a combination of one or more of them.

The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data. However, a computer need not have such devices. Computer readable media suitable for storing computer program instructions and data include all forms of non-volatile memory, media and memory devices.

To provide for interaction with a user, one or more aspects of the disclosure can be implemented on a head mounted display device, e.g., and LCD (liquid crystal display) monitor, or touch screen for displaying information to the user. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by computer programs running on the respective computers and having a client-server relationship to each other. In some implementations, a server transmits data (e.g., an HTML, page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination For instance two users having VR headsets can be trained in a two seat cockpit configuration.

Similarly, while operations are depicted in the drawings in an order, this should not be understood as requiring that such operations be performed in the order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and the described program components and systems can generally be integrated together in a single software product or packaged into multiple software products.

Several implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

The terminology used herein is for describing example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Upon reading this disclosure, those of skill in the art will appreciate still additional alternative structural and functional designs for a system and a process for deep search in computing environments through the disclosed principles herein. Thus, while embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. An input device for a seated VR user, the input device comprising:
    a floor engaging member having a floor engaging surface and a longitudinal axis generally perpendicular to the floor engaging surface;
    a seat support surface generally parallel to the floor engaging surface;
    a seat sensor is configured to detect the linear movement of the seat support surface with respect to the floor engaging member;
    a bearing disposed between the seat support structure configured to allow relative rotation of the seat support structure perpendicular to the longitudinal axis with respect to the floor;
    a fixed tactile surface positioned within arm's reach of the seated VR user;
    a movable tactile surface positioned within arm's reach of the seated VR user;
    a first plurality of sensors configured to detect the movement of the movable tactile surface with respect to the fixed tactile surface and provide a first signal thereof;
    a motion tracking head mounted display configured to receive a video signal input and having a second plurality of sensors configured to detect the movement of the head mounted display with respect the ground, said second plurality of sensors configured to provide a second signal indicative of the movement of the head mounted display with respect the ground; and
    a computer configured to receive the first and second signals and selectively convert user motion into control signals for motion and functional control of software incorporated in the computer; and
    wherein said computer is configured to provide video signals to the motion tracking head mounted display in response to the first signals.

2. The input device according to claim 1, wherein said computer being configured to provide signals to the motion tracking head mounted display in response to the second signals.

3. The input device according to claim 2, comprising a plurality of sensors configured to detect the movement of a first and a second movable tactile surface.

4. The input device according to claim 3, wherein the first and second movable tactile surfaces are disposed at first and second distances on an axis associated with the first and second moveable tactile surfaces, the second distance being less than the first distance.

5. The input device according to claim 4, wherein the motion tracking head mounted display is configured to create an image at the location of the fixed tactile surface.

6. The input device according to claim 4, wherein the motion tracking head mounted display is configured to create a second image component at the location of the movable tactile surface.

7. The input device according to claim 3, wherein the fixed and movable tactile surfaces have corresponding fixed and movable virtual tactile surfaces.

8. The input device according to claim 2 wherein the input device comprises at least one binary on/off switch which provides a digital output signal.

9. The input device according to claim 2 wherein the input device comprises at least one analog sensor which provides an analog output signal.

10. The input device according to claim 8 wherein the analog sensor detects one of the change in resistance and a change in capacitance.

11. A virtual reality system for a seated VR user, the virtual reality system comprising:
- a floor engaging member having a floor engaging surface and a longitudinal axis generally parallel to the floor engaging surface;
- a seat support coupled to and selectively movably with respect to the floor engaging surface;
- a seat sensor configured to detect the linear movement of the seat support with respect to the floor engaging member;
- a fixed tactile surface positioned within arm's reach of the seated VR user;
- a pair of movable tactile surfaces positioned within arm's reach of the seated VR user;
- a first plurality of sensors configured to detect the movement of the movable tactile surface with respect to the fixed tactile surface and provide a first signal thereof;
- a motion tracking head mounted display configured to receive a video signal input and having a second plurality of sensors configured to detect the movement of the head mounted display with respect the ground, said second plurality of sensors configured to provide a second signal indicative of the movement of the head mounted display with respect to the ground; and
- a computer configured to receive the first and second signals and selectively convert user motion into control signals for motion and functional control of software incorporated in the computer, said computer configured to provide signals to the motion tracking head mounted display in response to the first and second signals.

12. The input device according to claim 11, wherein the motion tracking head mounted display is configured to create an image at the location of the fixed tactile surface.

13. The input device according to claim 11, wherein the motion tracking head mounted display is configured to create a second image component at the location of the movable tactile surface.

14. The virtual reality system according to claim 11, wherein the pair of moveable tactile surfaces are disposed at a second distance from the longitudinal axis, the second distance being less than the first distance.

15. The virtual reality system according to claim 14, wherein the head mounted display is configured to produce a series of pictures in response to changes in signals from said second plurality of sensors.

16. The virtual reality system according to claim 11 wherein the seated VR user can be restricted to only portions of the control panel related to ground transportation of the aircraft.

17. The virtual reality system according to claim 11 further comprising an alarm will be sounded if a user attempts to engage with portions of the control panel not associated ground transportation of an aircraft.

18. An input device for a seated VR user, the input device comprising:
- a fixed tactile surface positioned on a floor within arm's reach of the seated VR user;
- a movable tactile surface positioned within arm's reach of the seated VR user;
- a first plurality of sensors configured to detect the movement of the movable tactile surface with respect to the fixed tactile surface and provide a first signal thereof;
- a seat sensor configured to detect the linear movement of the seated VR user with respect to the floor;
- a motion tracking head mounted display configured to receive a video signal input and having a second plurality of sensors configured to detect the movement of the head mounted display with respect the ground, said second plurality of sensors configured to provide a second signal indicative of the movement of the head mounted display with respect the ground; and
- a computer configured to receive the first and second signals and selectively convert user motion into control signals for motion and functional control of software incorporated in the computer.

19. The input device for a seated VR user according to claim 18 wherein a first portion of the control panel related to ground transportation is visually highlighted, and wherein an alarm is provided should the user attempt to engage a second portion of the control panel.

* * * * *